United States Patent [19]

Alger et al.

[11] 3,922,776

[45] Dec. 2, 1975

[54] METHOD FOR MAKING NARROW TRACK FERRITE CORE FLYING PADS

[75] Inventors: James A. Alger, Torrance; John J. Miyata, Monterey Park, both of Calif.

[73] Assignee: VRC California, Inc., El Segundo, Calif.

[22] Filed: May 13, 1974

[21] Appl. No.: 469,309

[52] U.S. Cl. .................. 29/603; 360/103; 360/122; 360/129

[51] Int. Cl.² ............................................ G11B 5/42

[58] Field of Search ...... 29/603; 360/103, 121, 122, 360/127, 129

[56] References Cited

UNITED STATES PATENTS

| | | | |
|---|---|---|---|
| 3,384,954 | 5/1968 | Bradford et al. | 29/603 |
| 3,577,634 | 5/1971 | Secrist | 29/603 |
| 3,735,052 | 5/1973 | Hoogendoorn et al. | 29/603 X |
| 3,789,505 | 2/1974 | Huntt | 29/603 |

*Primary Examiner*—Carl E. Hall
*Attorney, Agent, or Firm*—Fraser and Bogucki

[57] ABSTRACT

A high yield method for manufacturing a narrow precisely defined track width ferrite core flying pad in which a core is bonded to a support piece after which a portion of the core adjacent an air bearing surface of the support piece is removed, thereby narrowing the core width. The ferrite core having a glass filling narrowing to an apex toward the air bearing surface is lapped proximate to the apex to define an efficient gap depth. Grooving the air bearing surface adjacent the core provides a lapping tool approach region. The frontal portion of the core is lapped perpendicular to the frontal surface and within the groove providing a narrowed track width. Bonding a glass bead against a ridge formed by narrowing of the core provides protective support therefor. The groove is reground to define air bearing characteristics. Precision contouring provides a magnetic medium protective surface.

8 Claims, 8 Drawing Figures

METHOD FOR MAKING NARROW TRACK FERRITE CORE FLYING PADS

BACKGROUND OF THE INVENTION

1. Field of the Invention

This invention relates to methods for making flying pad assemblies and more particularly for high yield methods of manufacturing narrow track width ferrite core flying pad assemblies.

2. Description of the Prior Art

Ferrite recording heads are frequently used in magnetic recording and playback systems. The popularlity of ferrite materials for recording heads results from their properties of high magnetic permeability, high electrical resistivity and hardness. Unfortunately, ferrite is also extremely brittle and therefore difficult to machine. Typically, the machining of ferrite results in low percentage yields in head manufacture. Problems inherent in obtaining a machined ferrite head increase as attempts are made to obtain ferrite heads having increasingly narrow track widths.

Narrow track width recording heads have been found useful in various applications where high density storage is desirable such as in computer random access storage units and in video systems.

Core configurations involving a thin frontal portion for positioning adjacent a magnetic recording media have been used to provide a narrow width magnetic heads while a thicker portion of such cores remote from the recording medium provided increased structural rigidity and low reluctance magnetic paths. By way of example, a magnetic head having a narrowed frontal portion is described in U.S. Pat. No. 3,668,042, Farrand, issued June 6, 1972.

One suggested technique for obtaining a narrow track width head requires an initial removal of a portion of material from the frontal portion of a ferrite core, thereby leaving a somewhat narrow track size dimension defined by the remaining thickness of the frontal portion. A bead of low melting point glass is applied to the region exposed by the initial removal of material for providing a mechanical support. The surface opposite the glass bead may then be machined or lap-faced to provide a further reduction in the track width or thickness dimension. However, the glass bead provides only limited support for track width reduction.

Another method of obtaining a narrow track head has been to provide a laminated core comprising a plurality of folded thin magnetic laminations having a horseshoe configuration in which the frontal portions of the laminations progressively terminate approaching the frontal portion of the head.

Various tapered head designs have been described in which the narrowed portion of the head provides a narrow track width while the larger portions of the head provide increased strength and lower reluctance magnetic paths. It is difficult to accurately and precisely control recording track widths and gap depth when such tapering methods are used and, therefore, tapering also limits manufacturing yields for precision head configurations.

A further technique of producing a narrow track width head has been the deposition of a metallic film on a substrate, the film being attached to a substantially larger low reluctance backup element. Difficulties have been experienced in obtaining such heads with low reluctance magnetic paths. Furthermore, it has been difficult to provide platings with accurate gap definitions.

SUMMARY OF THE INVENTION

Methods of making a narrow track width flying pad in accordance with this invention involve the steps of bonding a ferrite core having a generally planar configuration to surfaces of a support piece and thereafter removing a portion of the ferrite material from a frontal portion of the core adjacent an air bearing surface of the support piece, thereby defining a narrow track size head. The support piece functions not only as a backup element during the process of narrowing the core but remains as an integral portion of the finished flying pad. The integrally joined core and support piece allows precision machining and lapping to final dimensions and facilitates handling of the fragile core, thereby enabling substantial yields.

In particular embodiments, a transverse groove adjacent to the core is made in the support piece for providing a region in which a cutting tool can easily approach the core for narrowing its effective track width. Subsequent refinements of the groove aerodynamically define a precise float position of the flying pad above the magnetic medium.

The core is lapped to a desired gap depth, approaching an apex of a filling in the core, thereby optimizing recording flux density adjacent the magnetic medium.

A bead is bonded along a surface of the core defined by a ledge resulting from core material removal. The glass bead physically supports the core in the finished flying pad. The bead supported frontal portion is thereafter lapped to provide a surface generally flush with the support element.

A contour finishing of the support piece provides a surface which may protectively travel above a moving magnetic medium absent sharp or jagged edges which could contact and cause damage or destruction of the magnetic surface.

DETAILED DESCRIPTION

Figures 1, 2, 3, 4, 5, 6:
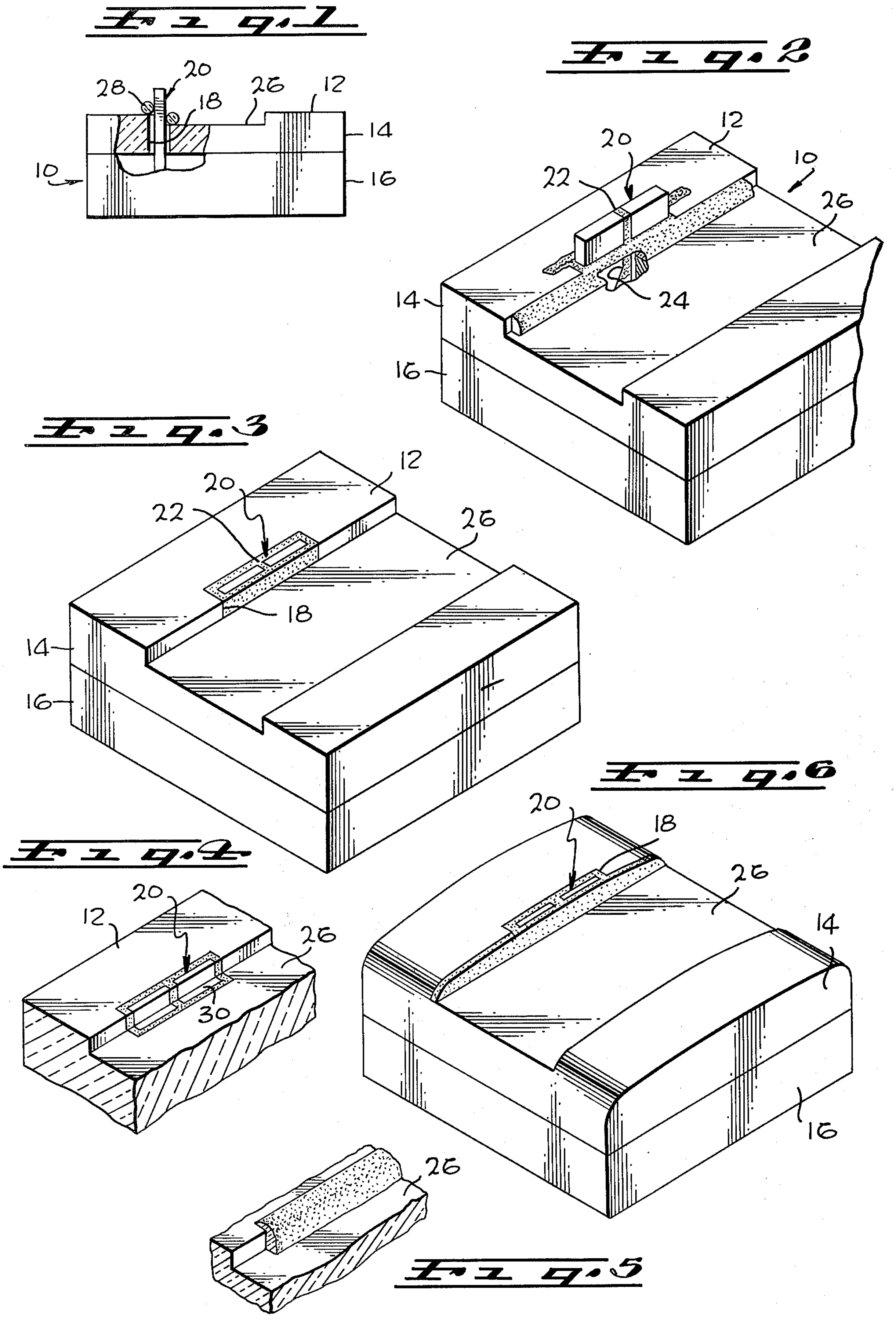
FIG. 1 is a plan view of an unfinished flying pad in which an unfinished core is disposed within an elongated opening of a support piece in accordance with a preferred method of this invention.
FIG. 2 is a perspective view with portions removed of the flying pad depicted in FIG. 1 and in which the core has been bonded to the support piece in accordance with this invention.
FIG. 3 is a perspective view of the flying pad depicted in FIG. 2 and in which the core has been lapped to a controlled gap depth and excess glass has been removed, in accordance with this invention.
FIG. 4 is a perspective view with portions removed of a portion of the flying pad depicted in FIG. 3 and in which the core has been narrowed in accordance with this invention.
FIG. 5 is a perspective view of a portion of the flying pad depicted in FIG. 4 in which a bead has been bonded along a ledge of the core.
FIG. 6 is a perspective view of a finished flying pad made in accordance with this invention with exaggerated dimensions.

Referring to FIGS. 1–6, a support piece 10 having a frontal surface 12 comprises a shoe 14 and a shield 16. The shoe 14 is ceramic while the shield 16 comprises a ferrite material, thermally bonded together with a glass lamina. The shoe 14 has an elongated opening 18 for receiving a ferrite core 20. The support piece 10 provides physical support for the core 20 both during core machining processes and continues to support the core in the finished flying pad.

Ferrite is used for the core 20 because of its high magnetic permeability and high electrical resistance. The thickness of the core 20 adjacent the frontal surface 12 defines track width. The core 20 has a gap defined by a ceramic filling 22 for providing a magnetic field thereacross. Throughout this specification, "ceramic" is a generic term which includes "glass." The ceramic filling 22 has a width which is uniform extending outward from the frontal surface 12 and expanding from an apex inward from the frontal surface 12. A gap depth, measured between the frontal surface of the core and the apex 24 affects flux density within the gap and efficiency of the head. High efficiency is achieved where the gap depth is small.

Figure 8:
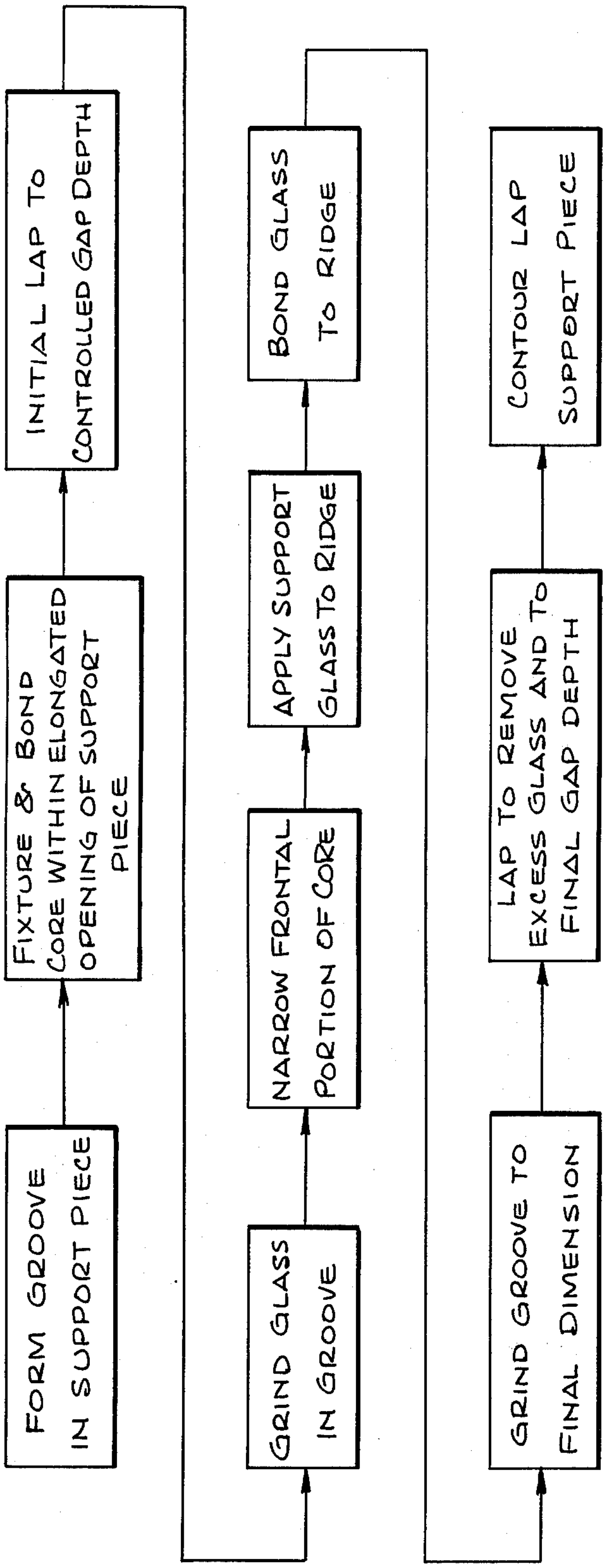

Reference is made to FIGS. 1–6 and the block diagram of FIG. 8 in describing a preferred method of making narrow track width heads or flying pads in accordance with this invention. A groove 26 is initially formed in the support piece 10 parallel and adjacent to and preferably also contiguous with the elongated opening 18. The support piece 10 is disposed such that the frontal surface 12 remains in a horizontal plane. The core 20 is inserted in the elongated opening 18 and is fixtured in place, allowing clearance between the core and the walls of the opening so that a bonding agent such as glass may flow between the surface of the core 20 and the walls. A pair of low melting temperature glass rods 28 typically 0.025 inch diameter and about twice the width of the core of about one-fourth inch are positioned on the support piece 10 along and adjacent the opposite widths of the core 20 as shown in FIG. 1. The core 20 and the support piece 10 are bonded together with the glass. The low temperature glass allows thermal bonding of the core 20 to the support piece 10 without disturbing previous bonds between elements of the support piece 10, such as the bond between the shoe 14 and the shield 16. The glass rods melt and flow by gravity and capillary action joining the core 20 to the support piece 10. Excess glass flows into the groove 26 as shown in FIG. 2.

The core 20 is initially lapped with a diamond impregnated cutting tool removing a transverse edge of the core 20 to a desired gap depth, usually close to the apex 24. Lapping to a final controlled gap depth is preferably accomplished following a subsequent glass bonding step described below.

The groove 26 is ground to remove excess glass, shown in FIG. 2, which has flowed into the groove 26 from the step of bonding the core 20 to the support piece 10. The groove 26, when finished, influences the level above a magnetic medium upon which the support piece rides, as well as providing tool access for the step of narrowing the thickness of the core. The groove is ground to a depth of about 0.005 inch.

The core 20 is narrowed to define a desired track width. Narrowing is performed by using a cutting tool in the groove 26, preferably after the excess glass has been removed as shown in FIG. 3. Ferrite is removed by lapping parallel to the plane of the core 20 at an end adjacent the frontal surface 12. This procedure provides the narrow track width particularly desirable when the flying pad is used in high density storage systems. The brittle nature of ferrite limits the extent of machining. However, since the ferrite core 20 has been bonded to the support piece prior to narrowing, a considerable amount of machining is possible without fracture. In practice, it has been found that a ferrite core having dimensions of about 0.12 × 0.06 × 0.004 inches may be successfully narrowed by about 0.003 inch to a thickness representing a track width of about 0.001 inch along the 0.12 inch dimension. FIG. 4 depicts a portion of the flying pad after the core 20 has been narrowed.

The lapping procedure of narrowing the track width exposes ridge 30 on the core 20. To provide support for the narrowed core 20, a glass rod or bead (not shown) having a low melting point is positioned on the ridge 30 and is bonded to the core 20 in a furnace. The melting point of the glass rod allows fusing at a low temperature, preventing a disturbance of previously formed glass bonds in the structure.

Groove 26 is reground and widened to its final dimension thereby removing the excess glass shown in FIG. 5 resulting from bonding the glass bead to the ridge 30. The final groove dimension affects the air bearing float position over a magnetic medium.

The support piece 10 and core 20 is again lapped to a final controlled gap depth, while removing portions of the glass formed from the step of bonding the glass to the ridge 30.

The support piece 10 is contour lapped to a radius of about 270 inches to provide a smooth air bearing surface thus, preventing desctructive contact between the flying pad and the magnetic medium. The finished head made in accordance with this invention is depicted in FIG. 6, the curvature of the support piece being greatly exaggerated.

In practice, it is desirable to clean and degrease the support piece 10 after each lapping or grinding step.

Figure 7:
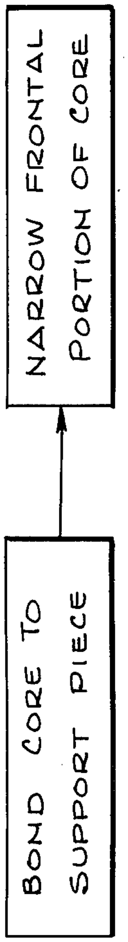
FIG. 7 is a block diagram broadly depicting the method for making a narrow track ferrite core flying pad in accordance with this invention; and, FIG. 8 is a detailed block diagram of a preferred method of this invention.

FIG. 7 broadly depicts the method of this invention. The core 20 is first bonded to a support piece 10. After bonding, the frontal portion of the core 20 is narrowed to the desired track width.

FIG. 8 depicts the preferred method of this invention described above. An initial groove 26 is formed in the support piece 10. The core 20 is fixtured in the elongated opening 18 and glass rods 28 are placed on the support piece 10, after which the core 20 is bonded thereto. The core 20 is initially lapped to a controlled gap depth. The groove 26 is ground to remove excess glass. The frontal portion of the core 20 is lapped or narrowed down to a desired track width. Glass is applied and bonded to the core 20 thereby filling the ridge 30 defined by the lapping operation. The groove 26 is ground to its final dimension removing excess glass and defining an air bearing float position. The core 20 is lapped to a final controlled gap depth, while smoothing irregular glass bonded on the frontal surface adjacent the ridge 30. The support piece 10 is contour lapped to provide a magnetic medium protective surface.

While the invention has been particularly shown and described in reference to preferred methods thereof, it will be understood by those skilled in the art that changes in form and details may be made therein without departing from the spirit and the scope of the invention.

What is claimed is:

1. A high yield method for manufacturing a narrow track width flying pad of the type comprising a ferrite core having a frontal portion of smaller width then a rearward portion, the core being ceramically bonded to a support piece, and the combined core and support piece having a finished surface for protectively approaching a moving magnetic record surface, comprising the steps of:

forming a groove adjacent to a core receiving opening in a support piece for providing a machining tool approach region;

bonding a generally planar ferrite core substantially perpendicular to a frontal surface of the support piece;

removing a portion of the ferrite generally parallel to the plane of the core and at an end of the core adjacent the frontal surface to form an effectively narrow track pole piece;

lapping the core generally parallel to the frontal surface to define a desired gap depth;

finishing the groove to define an air-bearing float level; and, contouring the frontal surface of the support piece to provide a magnetic medium protective air bearing surface.

2. The invention as set forth in claim 1, and further comprising the steps of:

bonding a bead along a ridge, formed by the removing step of narrowing the core, for supporting the narrowed frontal portion; and, lapping the bead supported frontal portion to make the beaded core flush with the frontal surface of the support piece.

3. The invention as set forth in claim 2, and in which the step of making a groove comprises the steps of grinding an initial groove in the support piece prior to the step of bonding the core to the support piece and grinding glass in the groove prior to the removing step of narrowing the core to remove excess material in the groove resulting from the step of bonding the core to the support piece.

4. The invention as set forth in claim 3, and in which the support piece comprises a shoe element glass bonded to a shield and the flying pad is formed by bonding the core to the support piece, comprising the steps of disposing at least one glass element on the frontal surface of the support piece along the core, the glass element having a melting temperature less than a melting temperature of a glass bond between the shoe and the shield and heating the assembly thereby obtained beyond the melting temperature of the glass element and less than the melting temperature of the glass bond between the shoe and the shield.

5. A high yield method for manufacturing a flying pad having a track width on the order of 0.001 inch, of the type comprising a ferrite core having a frontal portion of smaller width than a rearward portion and a combined core and support piece having a finished surface for protectively approaching a moving magnetic record surface, comprising the steps of:

grooving a support piece to a depth on the order of 0.005 inches to providing a cutting tool access region;

fixturing a ferrite core within an elongated opening of the support piece;

thermally bonding with glass the ferrite core to the support piece;

lapping the core parallel to a frontal surface of the support piece to a control gap depth;

grinding the groove to remove glass;

narrowing the frontal portion of the core to a final track width of the order 0.001 inch subsequent to the thermal bonding step to define a narrow track width;

positioning a glass rod on an exposed ridge of the narrowed core;

bonding the rod to the ridge to provide support for the narrowed core;

grinding the groove to a final dimension and removing excess glass from the groove resulting from the last mentioned bonding step;

lapping the support piece to remove glass and to define a final gap depth; and, contour lapping the support piece to a radius on the order of 270 inches to provide a magnetic surface protective finish.

6. The invention as set forth in claim 5 and in which the step of fixturing the core comprises the steps of disposing the core in the elongated opening of the support piece generally perpendicular to a frontal surface of the support piece, allowing clearance between the core and walls defining the elongated opening so that glass may flow between the surfaces of the cores and the walls, and disposing on the frontal surface of the support piece a pair of glass rods on the order of 0.025 inch diameter and on the order of twice the core width along and adjacent opposite widths of the core.

7. The invention as set forth in claim 5 and which the steps of narrowing the frontal portion of the core comprises the step of disposing a diamond cutting tool within the groove.

8. The invention as set forth in claim 5 in which the ferrite core has dimensions of the order of 0.12 inch length by 0.06 inch width by 0.004 inch thickness and in which the step of narrowing the core comprises the step of removing a thickness adjacent the frontal portion of the core on the order of 0.003 inch to provide a core thickness adjacent to the frontal portion of about 0.001 inch along the core width.

* * * * *